United States Patent
Özlütürk et al.

(10) Patent No.: US 6,895,045 B2
(45) Date of Patent: May 17, 2005

(54) BALANCING AMPLITUDE AND PHASE

(75) Inventors: Fatih M. Özlütürk, Port Washington, NY (US); Stephen G. Dick, Nesconset, NY (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 295 days.

(21) Appl. No.: 10/122,992

(22) Filed: Apr. 15, 2002

(65) Prior Publication Data

US 2002/0110201 A1 Aug. 15, 2002

Related U.S. Application Data

(63) Continuation of application No. 09/233,791, filed on Jan. 19, 1999, now Pat. No. 6,377,620.

(51) Int. Cl.[7] .............................. H03H 7/30; H03H 7/40; H03K 5/159
(52) U.S. Cl. ........................ 375/235; 375/285; 375/346; 455/296
(58) Field of Search ................................. 375/235, 329, 375/322, 326, 327, 344, 346, 224, 278, 284, 340, 343, 285; 455/296, 312; 329/304

(56) References Cited

U.S. PATENT DOCUMENTS

| | | | |
|---|---|---|---|
| 4,085,378 A | | 4/1978 | Ryan et al. |
| 4,729,110 A | * | 3/1988 | Welles et al. ............... 702/107 |
| 4,953,182 A | * | 8/1990 | Chung ........................ 375/344 |
| 5,105,195 A | * | 4/1992 | Conrad ........................ 342/174 |
| 5,134,634 A | * | 7/1992 | Yoshida ...................... 375/324 |
| 5,249,203 A | * | 9/1993 | Loper ......................... 375/344 |
| 5,263,196 A | | 11/1993 | Jasper |
| 5,604,929 A | * | 2/1997 | Loper et al. ................. 455/324 |
| 5,705,949 A | | 1/1998 | Alelyunas et al. .......... 329/304 |
| 5,949,821 A | * | 9/1999 | Emami et al. .............. 375/235 |
| 6,009,317 A | * | 12/1999 | Wynn .......................... 455/296 |
| 6,118,322 A | * | 9/2000 | Bockelman et al. ........ 327/317 |
| 6,330,290 B1 | * | 12/2001 | Glas ............................ 375/324 |

FOREIGN PATENT DOCUMENTS

| | | | |
|---|---|---|---|
| CN | 1196615 | 10/1998 | |
| WO | 98/32221 | 7/1998 | |
| WO | 9832221 | 7/1998 | ............ H03D/7/16 |

OTHER PUBLICATIONS

Andrew J. Viterbi: "Noncoherent Reception" and "Quasi–optimum Noncoherent Multipath Reception for M–ary Orthogonal Modulation"; 1995; "CDMA Principles of Spread Spectrum Communication";Addison–Wesley Publishing Company; ISBN 0–201–63374–4, Sub–Chapters 4.5/4.5.1; pp. 96–105.

(Continued)

*Primary Examiner*—Phuong Phu
(74) *Attorney, Agent, or Firm*—Volpe and Koenig, P.C.

(57) ABSTRACT

A system for balancing a signal having I and Q components includes means for cross correlating the I and Q components to produce a cross correlation product; means for adjusting the gain of each I and Q signal component in accordance with said cross correlation product; and means for adding one component with the adjustable gain of the other component to produce a phase-balanced signal.

7 Claims, 4 Drawing Sheets

OTHER PUBLICATIONS

Glass: Digital I/Q Imbalance Compensation In A Low–IF Receiver; Ieee Global Telecommunications Conference, Nov. 8–12, 1998, pp. 1461–1466.

Hiroshi Suzuki, Hitoshi Yoshino: Affine Transformations For Compensating Linear Distortion: An Application To Linear Signaling In Mobile Radio; Electronics & Communications In Japan, Part I, vol. 75, No. 1, (Jan. 1992), pp. 47–58.

Viterbi, "Noncoherent Reception" and "Quasi–optimum Noncoherent Multipath Reception for M–ary Orthogonal Modulation," *CDMA Principles of Spread Spectrum Communication*, Addison–Wesley Publishing Company, ISBN 0–201–6334–4, 1995, Subchapters 4.5/4.5.1, pp. 96–105.

Glas, "Digital I/Q Imbalance Compensation in a Low–IF Receiver," IEEE Global Telecommunications Conference, Nov. 8–12, 1998, pp. 1461–1466.

Suzuki et al., "Affine Transformations for Compensating Linear Distortion: an Application to Linear Signalling in Mobile Radio," *Electronics and Communications in Japan*, Part I, vol. 75, No. 1, Jan., 1992, pp. 47–58.

\* cited by examiner

PHASE IMBALANCE

AMPLITUDE IMBALANCE

BALANCED

BALANCING AMPLITUDE AND PHASE

CROSS REFERENCE TO RELATED APPLICATIONS

This application is a continuation of application Ser. No. 09/233,791, filed Jan. 19, 1999 now U.S. Pat. No. 6,377,620 which application is incorporated herein by reference.

BACKGROUND

1. Field of the Invention

The present invention relates generally to digital communication techniques. More specifically, the invention relates to a system and method for balancing the amplitude and phase of a received, quadrature-phase modulated signal.

2. Description of the Prior Art

One of the common methods for modulating digital signals is the use of multilevel systems or M-ary techniques. M-ary modulation techniques are natural extensions of binary modulation techniques and apply to L-level amplitude or phase shift keying. A commonly used quadriphase scheme is called quadrature phase shift keying or QPSK. Like all of the M-ary amplitude or phase schemes, its principle advantage is bandwidth reduction.

Since pulse rate $f_p$ is:

$$f_p = f_s \log_L M, \qquad \text{Equation 1}$$

where $f_s$ is the symbol rate and M is the number of messages; with L representing the number of modulation levels, the larger L is, the smaller the pulse rate and hence, the smaller the bandwidth.

In telecommunication applications, QPSK modulates two different signals into the same bandwidth creating a two-dimensional signal space. This is accomplished by creating a composite phase modulated signal using two carriers of the same frequency but having a phase difference of 90 degrees as shown in FIG. 1A. By convention, the cosine carrier is called the in-phase component I and the sine carrier is the quadrature component Q. The I component is the real component of the signal and the Q component is the imaginary component of the signal. Each of the I and Q components are bi-phase modulated. A QPSK symbol consists of at least one sample from both the in-phase I and quadrature Q signals. The symbols may represent a quantized version of an analog sample or digital data.

All phase modulated schemes must overcome the inevitable problem of phase synchronization. For proper operation of QPSK signaling, the I and Q channels should have the same gain throughout processing both received channels, keeping the I and Q channels uncorrelated. Mismatched signal gains or magnitudes between the uncorrelated I and Q channels create errors when processing. Phase differences other than 90 degrees between the signals cause spillover between the channels and similarly result in degraded performance.

Typical receivers exhibit different overall gains for the separate I and Q channels due to mismatched gains in the mixers, filters, and A/D converters caused by variations in component values due in part to temperature, manufacturing tolerances and other factors. Amplitude and phase imbalance between the I and Q channels result in the distortions shown in FIGS. 1B and 1C, decreasing overall signal-to-noise ratio (SNR).

Prior art approaches taken to avoid amplitude and phase imbalance rely upon very precise circuitry controlling each gain stage with active temperature compensation. These expensive designs require components that are manufactured with extremely low temperature coefficients and with the mixers for the I and Q channels custom matched during manufacture.

Accordingly, there exists a need for a system that balances the amplitude and phase of a QPSK signal upon reception increasing signal integrity and thereby reducing bit error rate (BER).

SUMMARY

The present invention balances the amplitude and phase of a received QPSK signal that may have been corrupted during transmission. The output from the system is a signal corrected in both amplitude and phase. The system determines the amplitude of the I and Q channels of a received signal, compares them, and applies a correction to one or both channels correcting amplitude imbalance. For phase imbalance, the system calculates the cross-correlation of the I and Q channels which should average to zero. A correction factor is derived from the cross-correlation product and is applied to both channels, returning the phase cross-correlation to zero.

Accordingly, it is an object of the invention to provide a system which balances the amplitude of a received QPSK signal.

It is a further object of the invention to provide a system which balances the phase of a received QPSK signal.

Other objects and advantages of the system and method will become apparent to those skilled in the art after reading the detailed description of the preferred embodiment.

BRIEF DESCRIPTION OF THE DRAWING(S)

DETAILED DESCRIPTION OF THE PREFERRED EMBODIMENT(S)

Figure 1C:
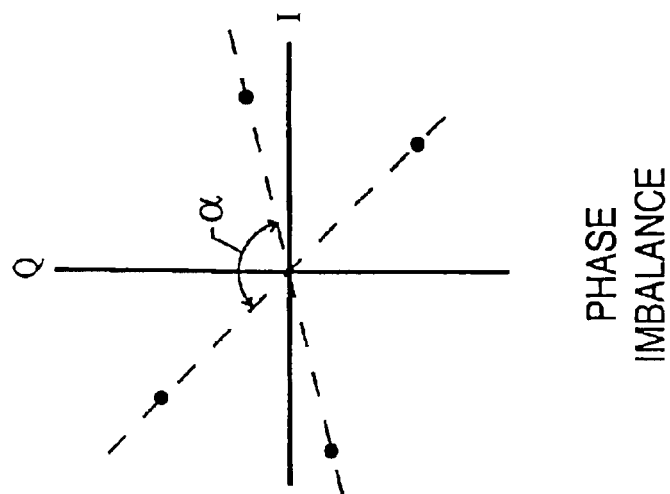
FIG. 1C is a plot of a QPSK symbol, phase imbalanced.
Figure 1B:
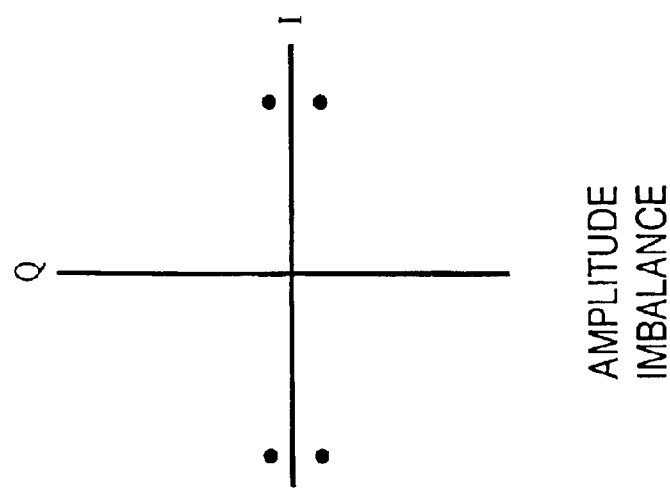
FIG. 1B is a plot of a QPSK symbol, amplitude imbalanced.
Figure 1A:
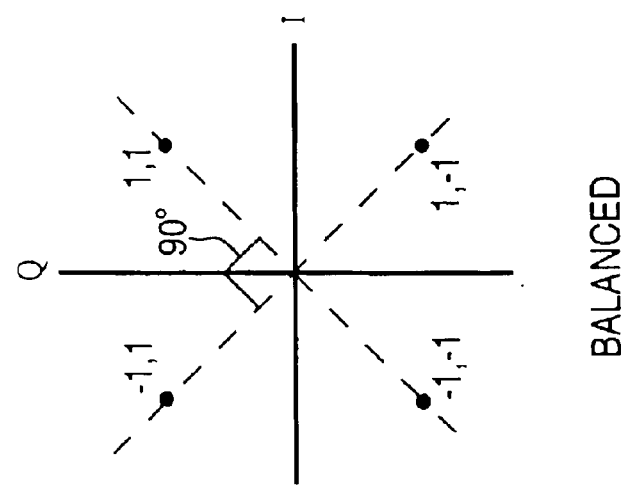
FIG. 1A is a plot of a QPSK symbol, balanced in both amplitude and phase.

The preferred embodiment will be described with reference to the drawing figures where like numerals represent like elements throughout.

Figure 2:
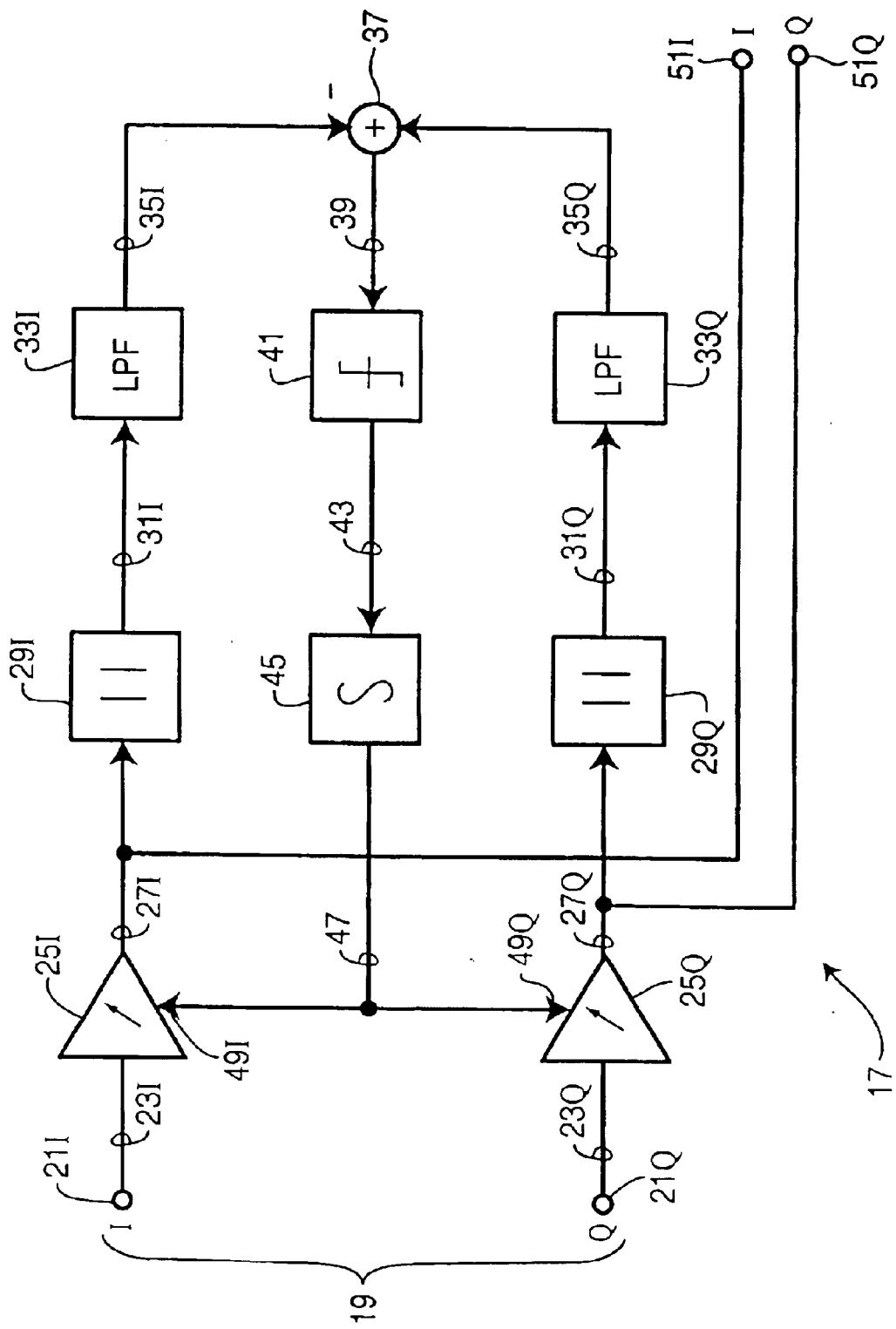
FIG. 2 is a block diagram of an amplitude balancing system in accordance with the present invention.

An embodiment showing the amplitude balancing system 17 of the present invention is shown in FIG. 2 where two bi-phase modulated signals 19 are input 21I, 21Q. Quantizing is the process of measuring the intensity of a signal in each sample and assigning a digital number to that measured value. Each time the sampling circuit samples the signal, it measures the intensity of the varying analog signal at that discrete moment in time. The input 23I, 23Q data streams represent the discrete samples of data assembled into finite words each having a plurality of bits. The number of bits that define each word determine the total quantization of each sample or symbol. For example, six-bit quantization:

$$\text{quantization levels}=2^n-1 \qquad \text{Equation 2}$$

with n equal to 6 would yield a resolution of 63 levels. Desired signal resolution determines n.

Each signal 23I, 23Q component, I and Q, is coupled to an input of an amplifier 25I,25Q which has an adjustable gain. The output 27I,27Q of the amplifiers 25I, 25Q are coupled to an absolute value processor 29I, 29Q to obtain the relative magnitudes of each incoming symbol 23I, 23Q. The output 31I, 31Q of the absolute value processors 29I, 29Q are coupled to inputs of respective low pass filters 33I, 33Q.

The low pass filters 33I, 33Q time-average the received component symbols 23I, 23Q, giving additional weight to recent samples and decreasing weight to previous. samples. In the present embodiment 17, IIR (infinite impulse response) filters 33I,33Q with one pole are used, however, other types of filters or different order IIR filters can also be used without deviating from the principle of the invention. The low pass filter outputs 35I, 35Q present averaged estimates of the sample amplitudes output from the absolute value processors 29I, 29Q.

A summer 37 obtains the difference from the outputs 35I,35Q of the low pass filters 33I, 33Q producing an error reference signal 39. If the I and Q components of an input signal 23I, 23Q are orthogonal to each other, the error reference signal 39 will have zero magnitude, indicating a balanced symbol. If the error reference signal 39 produces a value other than zero, the symbols are not amplitude balanced.

A non-zero-value error reference signal 39 becomes an error correction value. The reference signal 39 is coupled to an input of a hard limiter processor 41. The hard limiter 41 outputs a signal 43 smaller in magnitude, either positive or negative, in dependence upon the error reference signal 39. The hard limiter processor 41 clips the error reference signal 39 magnitude thereby making the sign of the error reference signal 39 a correction factor. This is done for simplifying the implementation, the hard limiter is not essential to the invention.

The output 43 of the hard limiter processor 41 is coupled to a leaky integrator which is an accumulator 45. The accumulator 45 adds the present value input with an accumulated value from previous input values and outputs 47 a sum. Since the accumulator 45 has a finite bit width, over time, the accumulated value will self-limit in magnitude and plateau if errors persist and are great. The accumulated plurality of error reference signals 39 in the internal accumulator of the accumulator 45 will average to zero when the system reaches stasis.

The output 47 from the accumulator 45 is coupled to a gain input 49I, 49Q on each adjustable gain amplifier 25I, 25Q. The amplifiers 25I, 25Q balance the amplitudes of the received I and Q symbols 23I, 23Q, increasing or attenuating their gains in dependence with the accumulator 45 output signal 47. As can be seen, the reference signal 39 is negative feedback to the upstream amplification stages 25I, 25Q. A positive control voltage at the gain input 49I, 49Q indicates a gain increase for that amplifier; a negative control voltage indicates attenuation.

If the amplitudes of the input signals 23I, 23Q are not balanced, the system will adjust the variable amplifiers 25I, 25Q (attenuating one component while boosting the other) according to the accumulator 45 output signal 47 until the I and Q symbol amplitudes are within a predetermined tolerance. If the symbol gains are equal, but vary between received symbols, the system 17 will not effect correction. A downstream automatic gain control (AGC)(not shown) equalizes the system output 51I, 51Q for further signal processing (not shown).

Figure 3:
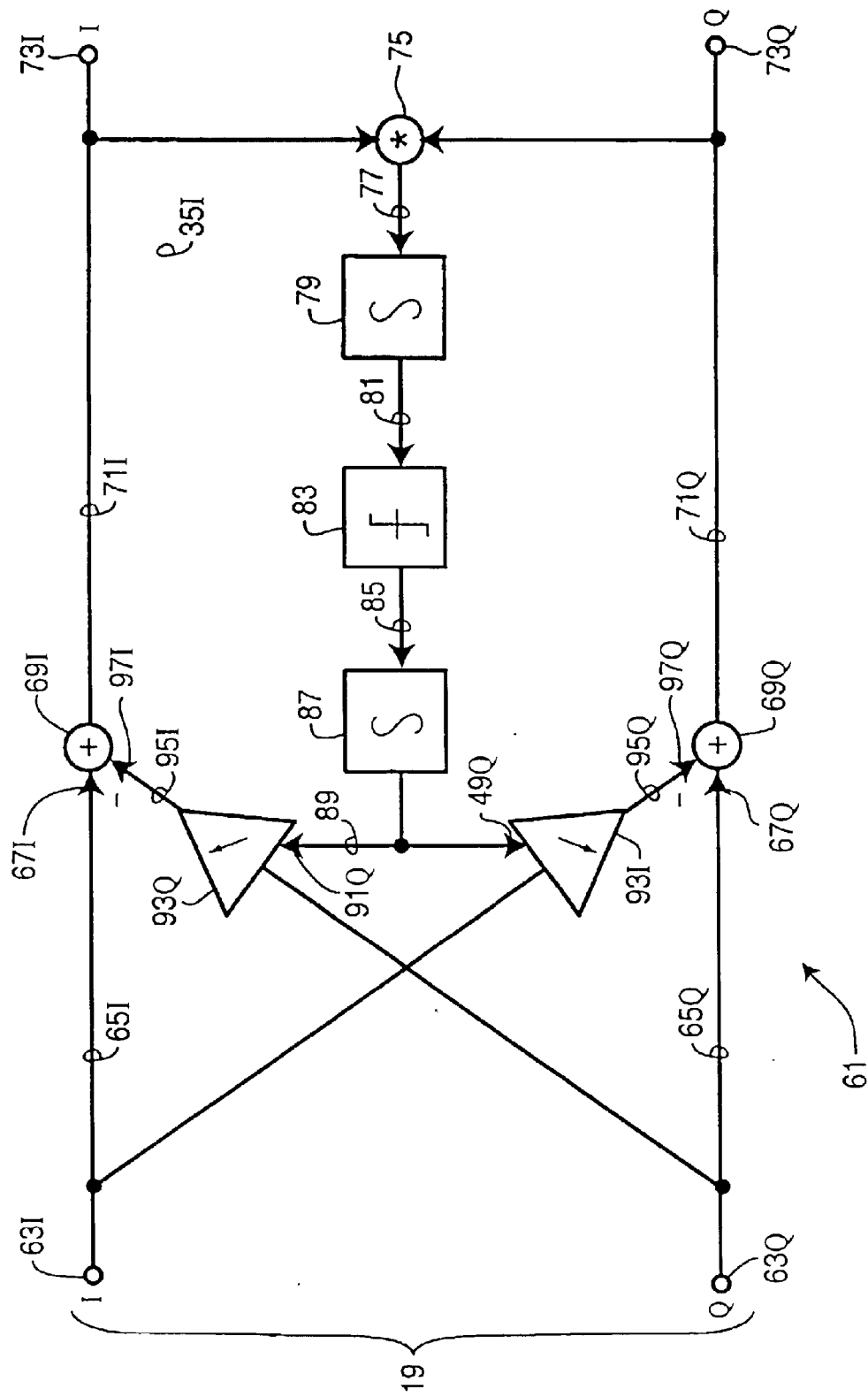
FIG. 3 is a block diagram of a phase balancing system in accordance with the present invention.

An embodiment showing the phase correction system 61 of the present invention is shown in FIG. 3. Two bi-phase modulated signals 19 are input 63I, 63Q into the system 61. The input 63I, 63Q data streams 65I, 65Q for the I and Q symbols are coupled to a first input 67I, 67Q of parallel summers 69I, 69Q. The output 71I, 71Q of each summer 69I, 69Q are the system output 73I, 73Q and feedback for the phase correction system 61. Both feedback lines 71I, 71Q are coupled to a mixer 75 for correlation. The mixer 75 cross-correlated output signal 77 is coupled to an integrator 79. The integrator 79 time-averages the cross-correlation product 77. The integrator output is coupled to a hard limiter processor 83. The hard decision processor 83 limits the magnitude of the integrated cross-correlation product. The hard decision processor 83 output 85 retains sign. The hard limiter processor 83 output 85 is coupled to an accumulator input 87. The hard decision processor 83 reduces implementation complexity, one skilled in this art would recognize that it is not essential.

As previously discussed, the function of an accumulator is to accumulate, over-time, the present input value with previous inputs. The sum is output as a correction signal.

The correction signal 89 is coupled to a first input 91I of a variable gain amplifier 93I coupling the Q input 65Q with the I input 63I. The correction signal 89 also is coupled to a first input 91Q of a variable gain amplifier 93Q coupling the I symbol input 65I with the Q input 63Q.

The correction signal 89 adjusts both amplifiers 93I, 93Q increasing or decreasing their gain. The amplifier outputs 95I, 95Q are coupled to a second input 97I, 97Q of the input adders 69I, 69Q.

Figure 4:
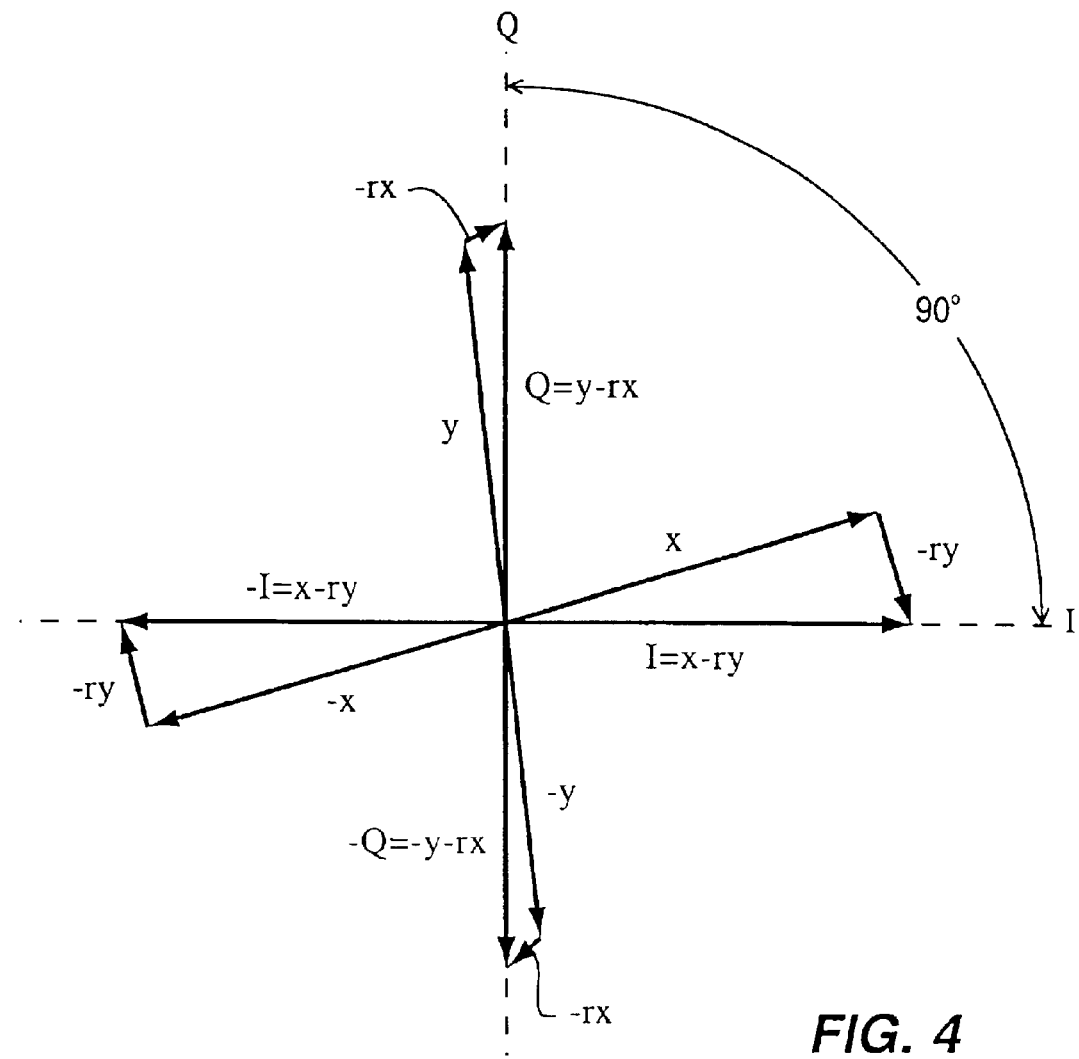
FIG. 4 is a vector representation showing phase correction.

The phase correction is shown as a vector representation in FIG. 4. The adders 69I, 69Q subtract the portion of Q component 63Q from the I component 65I;

$$I=x-r\,y, \qquad \text{Equation 3}$$

$$-I=-x-r\,y, \qquad \text{Equation 4}$$

where r $\triangleq$ cross correlation, and the portion of I component 63I from the Q component 65Q;

$$Q=y-xr, \qquad \text{Equation 5}$$

$$-Q=-y-xr, \qquad \text{Equation 6}$$

where r $\triangleq$ cross correlation, in order to remove the cross correlation contribution from each. Once the parts of the signals that result in the cross correlation are removed, the outputs 71I and 71Q of the adders 69I, 69Q become uncorrelated I, Q and orthogonal in signal space.

Figure 5:
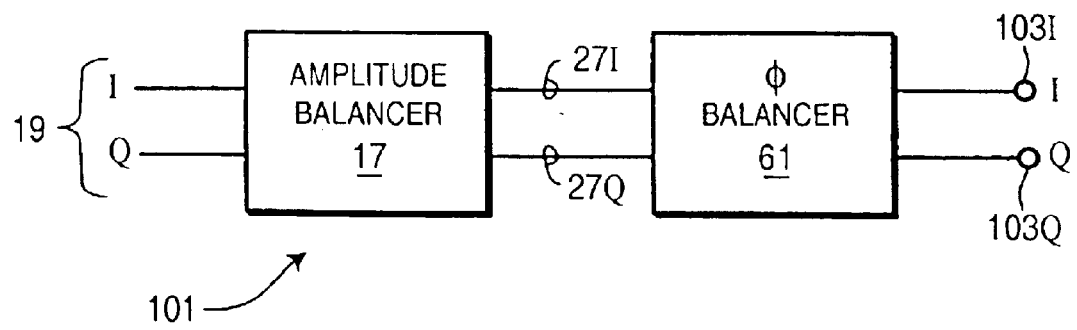
FIG. 5 is a block diagram of a combined amplitude and phase balancing system in accordance with the present invention.

An alternative embodiment combining both systems correcting amplitude 17 and phase 61 imbalance is shown in FIG. 5. The system 101 is a simple series connection outputting 103I, 103Q a symbol corrected in both amplitude and phase. Another combined embodiment where the amplitude balancer 17 follows the phase balancer 61 is also possible.

While specific embodiments of the present invention have been shown and described, many modifications and variations could be made by one skilled in the art without departing from the spirit and scope of the invention. The above description serves to illustrate and not limit the particular form in any way.

What is claimed is:

1. A system for balancing a signal having I and Q components comprising:
   means for cross correlating a balanced I signal with a balanced Q signal to produce a cross correlation product, the balanced I signal, being derived from the I component and the balanced Q signal, being derived from the Q component;
   means for time averaging the cross correlation product;
   means for adjusting a gain of each I and Q component in accordance with said time averaged cross correlation product; and
   means for adding the I component with a Q component adjusted by said adjusting means, and the Q component with an I component adjusted by said adjusting means to produce a phase-balanced signal.

2. A system for balancing a signal having I and Q components, the system comprising:
   means for comparing the magnitudes of an amplitude-balanced I signal with an amplitude-balanced Q signal, the amplitude-balanced I signal being derived from the I component and the amplitude-balanced Q signal being derived from the Q component;
   means for generating a correction signal for both the I and Q components based on the magnitude comparison;
   first means for adjusting a gain of the I and Q components in dependence upon said correction signal to produce an amplitude balanced signal;
   means for cross correlating a phase-balanced I signal with a phase-balanced Q signal to derive a cross correlation product, the phase-balanced I signal and the phase-balanced Q signal being derived from the amplitude balanced signal;
   means for time-averaging the correlation product;
   second means for adjusting the gain of each I and Q component in accordance with said time-averaged cross correlation product; and
   an adder for adding the I component with an adjusted Q component adjusted by the second means for adjusting, and the Q component with an adjusted I component adjusted by the second means for adjusting to produce an amplitude and phase balanced signal.

3. The system of claim 2, whereby said first means for adjusting includes I and Q amplifiers, and wherein said system further comprises:
   respective I and Q low pass filters coupled to said means for comparing; and
   an absolute value processor, having an input coupled to said low pass filters and an output coupled to said first means for adjusting.

4. A system for balancing a signal having I and Q components, comprising:
   an I adjustable gain amplifiers;
   a Q adjustable gain amplifier;
   an I mixer, having a first mixer input for receiving an I input and a second mixer input coupled to an output of the Q adjustable gain amplifier, and having an I mixer output;
   a Q mixer having a first mixer input for receiving a Q input and a second mixer input coupled to an output of the I adjustable gain amplifier, and having a Q mixer output; and means for controlling a gain of each of said I adjustable gain amplifier and Q adjustable gain amplifier,
   wherein the controlling means includes
   an I and Q cross correlation means, coupled to said I and Q mixer outputs, which generates a cross correlation product; and
   means for time-averaging the cross correlation product,
   whereby said cross correlation product is coupled to said I adjustable gain amplifier and Q adjustable gain amplifier to control the gain of said I adjustable gain amplifier and Q adjustable gain amplifier; and whereby phase balanced I and Q signals are output from said I mixer output and Q mixer output, respectively.

5. A system for balancing I and Q signal inputs, comprising:
   an I adjustable gain amplifier for receiving said I signal input and having an I output;
   a Q adjustable gain amplifier for receiving said Q signal input and having a Q output;
   an I mixer having a first mixer input coupled to said I signal input and a second mixer input coupled to said Q output, and having an I mixer output;
   a Q mixer having a first mixer input coupled to said Q signal input, and a second mixer input coupled to said I output and having a Q mixer output; and
   means for controlling gain of each said I adjustable gain amplifier and Q adjustable gain amplifier,
   wherein said controlling means comprises:
   an I and Q cross correlation means coupled to said I and Q mixer outputs for generating a cross correlation product;
   means for time averaging the cross correlation product;
   said cross correlation product coupled to said I adjustable gain amplifier and Q adjustable gain amplifier to control gain of said I adjustable gain amplifier and Q adjustable gain amplifier; and
   whereby phase balanced I and Q signals are output from said I mixer output and said Q mixer output, respectively.

6. A system for balancing a signal having I and Q components, comprising:
   means for comparing the magnitude of the I component with the magnitude of the Q component;
   means for generating a correction signal for both the I and Q components based on the magnitude comparison;
   first means for adjusting a gain of the I and Q components in dependence upon said correction signal to produce an amplitude balanced signal;
   means for cross correlating the I and Q components of an amplitude and phase balanced signal to derive a cross correlation product, the amplitude and phase balanced signal being derived from said amplitude balanced signal;
   means for time averaging the cross correlation product;
   second means for adjusting a gain of each amplitude balanced I and Q components in accordance with said time-averaged cross correlation product; and
   means for adding the amplitude balanced I component with a Q component adjusted by the second adjusting means, and adding the amplitude balanced Q component with an I component adjusted by the second adjusting means to produce an amplitude and phase balanced signal.

7. A system for balancing a signal having I and Q components, comprising:

means for cross correlating a balanced I signal with a balanced Q signal, the balanced I signal, being derived from the I component and the balanced Q signal, being derived from the Q component;

means for deriving a cross correlation product;

means for time-averaging the cross correlation product;

means for adjusting a gain of each I and Q component in accordance with said time-averaged cross correlation product; and means for adding the I component with a Q component adjusted by said adjusting means and the Q component with an I component adjusted by said adjusting means to produce a phase balanced signal.

* * * * *

UNITED STATES PATENT AND TRADEMARK OFFICE
CERTIFICATE OF CORRECTION

PATENT NO.     : 6,895,045 B2
DATED          : May 17, 2005
INVENTOR(S)    : Ozluturk Page 1 of 1

It is certified that error appears in the above-identified patent and that said Letters Patent is hereby corrected as shown below:

<u>Column 3,</u>
Line 19, after the word "filters,", delete "33I,33Q" and insert therefor -- 33I, 33Q --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,895,045 B2 Page 1 of 1
APPLICATION NO. : 10/122992
DATED : May 17, 2005
INVENTOR(S) : Ozluturk et al.

It is certified that error appears in the above-identified patent and that said Letters Patent is hereby corrected as shown below:

ON THE TITLE PAGE

Item (12), page 1, left column, delete "Özlütürk et al" and insert therefor --Ozluturk et al--.

Item (75), page 1, left column, delete "Fatih M. Özlütürk, Port Washington," and insert therefor --Fatih M. Ozluturk, Port Washington,--.

Signed and Sealed this

Fourteenth Day of August, 2007

JON W. DUDAS
*Director of the United States Patent and Trademark Office*